J. P. FARLEY.
CUSPIDOR.
APPLICATION FILED FEB. 6, 1912.
1,120,919.
Patented Dec. 15, 1914.
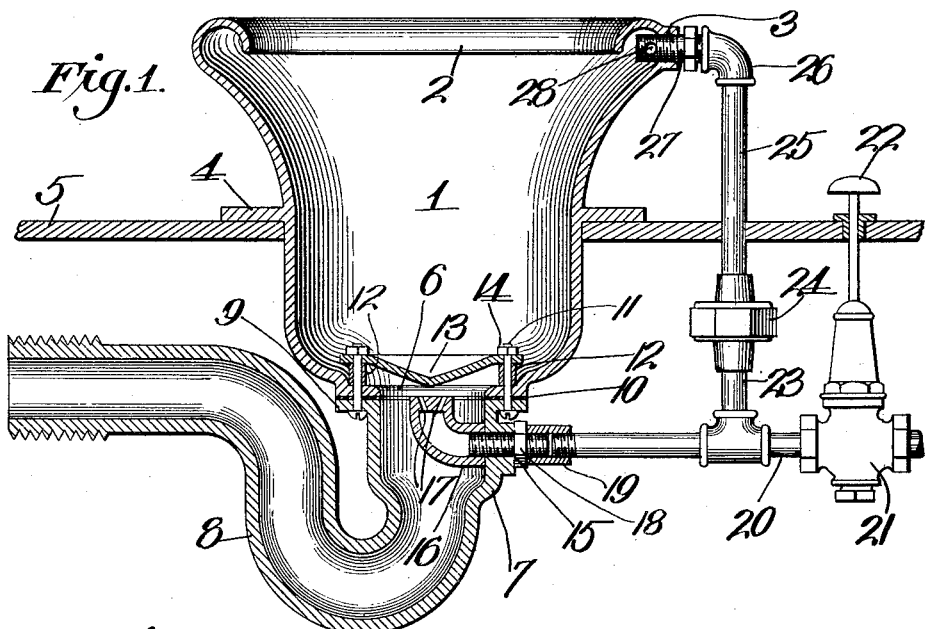
Fig. 1.
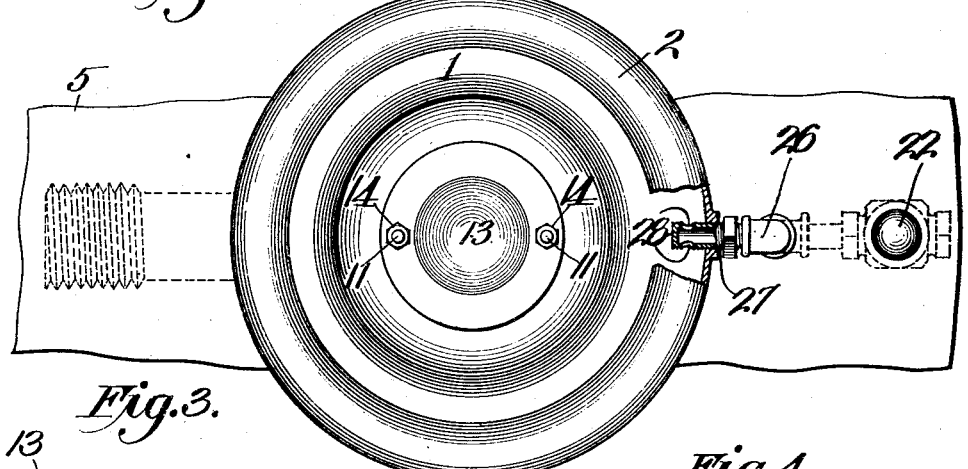
Fig. 2.
Fig. 3.
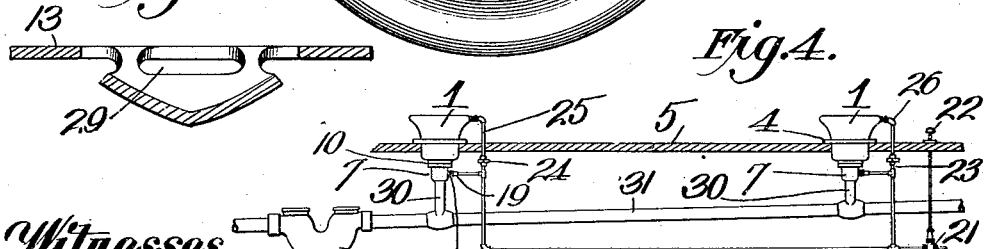
Fig. 4.
Witnesses
Frank R Glow
H. C. Rodgers
Inventor
J. P. Farley
By George L. Thorpe Atty.

UNITED STATES PATENT OFFICE.

JOHN P. FARLEY, OF KANSAS CITY, MISSOURI.

CUSPIDOR.

1,120,919.  Specification of Letters Patent.  Patented Dec. 15, 1914.

Application filed February 6, 1912. Serial No. 675,720.

*To all whom it may concern:*

Be it known that I, JOHN P. FARLEY, a citizen of the United States, residing at Kansas City, in the county of Jackson and State of Missouri, have invented certain new and useful Improvements in Cuspidors, of which the following is a specification.

This invention relates to cuspidors, and my object is to produce a fountain cuspidor for use in public places which can be flushed as often as desired and kept in a sanitary condition without being manually cleaned.

To this end the invention consists in certain novel and peculiar features of construction and organization as hereinafter described and claimed; and in order that it may be fully understood reference is to be had to the accompanying drawing, in which—

Figure 1, is a central vertical section of a cuspidor embodying my invention, arranged in operative position. Fig. 2, is a top plan view of the same, partly broken away. Fig. 3, is a vertical section of a modified form of plate employed as a deflector, and false bottom of the cuspidor. Fig. 4, is a view on a reduced scale showing a battery of cuspidors controlled by a single valve and provided with a trap in common.

In the said drawing, 1 indicates the bowl of the cuspidor, having a flared upper end, and at its upper margin the wall is provided with an inturned rolling flange 2, to prevent water splashing out of the bowl as hereinafter explained, and said wall is provided with an opening 3, and an external flange 4 to rest upon the floor 5, through which the bowl depends. The bowl is provided with a central bottom opening 6, registering with the upper end of a receptacle 7, which in an individual cuspidor will form the receiving end of a water-seal trap 8, adapted to be connected in the customary manner to a soil pipe, not shown. The receptacle 7 is preferably provided at its upper end with an external flange 9, and a gasket 10 is interposed between said flange and the bottom of the bowl around the opening 6 thereof, and to secure said parts in rigid relation, stove bolts 11 extend up through said flange, gasket and the bottom of the bowl, and also extend through sleeves 12 resting on the bottom of the bowl and a plate 13 resting on the sleeves, nuts 14 engaging the upper ends of the bolts to clamp the plate reliably in position. This plate constitutes a false bottom and deflector for the bowl, and the sleeves 12 space it from the bowl for a purpose which hereinafter appears. The central portion of the plate is depressed to substantially cone-shape as shown in Figs. 1 and 3, for the purpose chiefly of deflecting the water discharged against its underside, radially outward between the outer margin of the plate and the bottom of the bowl. Projecting into the receptacle 7 is a threaded tube 15 and mounted upon the inner end of the same is an upright elbow 16, provided at its upper end with one or more jet orifices 17 arranged to discharge against the bottom of the plate 13.

18 is a lock nut engaging tube 15 at the outer end of receptacle 7, and 19 is a coupling connecting the outer end of tube 15 with pipe 20, controlled by a self-closing valve 21, provided with a push rod 22, by which the valve is opened by foot power or otherwise.

23 is a branch pipe leading from pipe 20, and connected by a union 24 with a pipe 25 equipped at its upper end with an elbow 26 carrying a tube 27 extending through opening 3 into the upper part of the bowl, and provided in opposite sides with orifices 28 through which water is adapted to be discharged into the bowl in such a manner that it will travel in opposite directions spirally downward and encounter a circular upwardly moving wall of water supplied through orifices 17, and deflected by plate 13 and the bottom of the bowl outwardly and upwardly, the two currents of water meeting and together thoroughly cleansing the interior of the bowl. Under such encounter of the two currents, the water is violently agitated and thoroughly cleans the deflector, and effects the disintegration of cigar stubs and the like so that the same shall flow off with the water through the trap to the sewer, it being of course understood that cigar stubs may not be thoroughly disintegrated until they have remained in the bowl for a sufficient length of time to become thoroughly water-soaked. Of course it may be necessary occasionally for the porter to remove material from the cuspidor, but such contents will have been rendered sanitary by repeated flushing operations.

No matter can adhere to the plate 13 which cannot be readily washed off because the hollow upper side of the same will always stand charged with water, which water and any matter therein will be washed off with the first ensuing flushing operation and replaced by a new charge. It may be desirable to equip cuspidors used in hotels and like places with plates 13 having openings 29 to facilitate the discharge of semi-solid matter and thus avoid the necessity of occasionally cleaning the bowls by hand.

In Fig. 4, a plurality of cuspidors are shown on the same floor and the receptacle 7 of each is provided with a depending stem 30, connected to a single waste pipe 31 terminating in a trap 32 common to all the cuspidors. In this figure the arrangement of the piping is the same, and a single valve is shown for controlling the passage of water to all of the bowls.

From the above description it will be apparent that I have produced a sanitary cuspidor possessing the features of advantage enumerated as desirable in the statement of the object of the invention, and while I have shown and described the preferred embodiment of the invention, I wish it to be understood that I reserve the right to make all the changes in form, proportion, detail construction and arrangement of the parts, which properly fall within the spirit and scope of the appended claims.

I claim:—

1. A cuspidor, comprising a bowl having a discharge opening in its bottom, an inverted cone-shaped plate fixed over said opening and spaced therefrom, a water-supply pipe leading into said opening and having a series of jet openings surrounding the lowermost portion of said plate, whereby the water supplied by said pipe will be directed upward along the inner sides of the bowl, and means for discharging an annular stream of water downward along the inner sides of the bowl from the top thereof, thereby forming two opposed currents of water meeting part way up the sides and around the entire circumference of the bowl.

2. A cuspidor comprising a bowl having a discharge opening in its bottom, a plate supported above and of greater diameter than said opening and provided with a central depending conical portion and openings at the upper end thereof, means to discharge water onto the inner surface of the bowl so that it may flow downward thereon, and means to discharge water upward into the bowl through the opening in the bottom thereof to cause it to meet the down flow from the first-named means and cascade inward onto the said plate and escape through said openings thereof.

3. A cuspidor comprising a bowl having a discharge opening in its bottom, a water seal trap secured at one end to the bowl and communicating with the said opening thereof, a plate having its marginal portion above and spaced from the bottom of the bowl around the said opening thereof and having a central inverted conical depending portion, a valve controlled water supply pipe leading into the trap and arranged to discharge a stream of water upward against the apex of the inverted conical portion of said plate whereby the water will be caused to pass into the bowl between the bottom thereof and said plate and then flow upward along the inner side of the bowl and a branch pipe leading from the water supply pipe at a point between the bowl and the valve for discharging water onto the inner surface of the bowl so that it may flow downward thereon, and meet the up-flow within the bowl from the first-named pipe, to produce a cascade of water down upon the said plate.

In testimony whereof I affix my signature, in the presence of two witnesses.

JOHN P. FARLEY.

Witnesses:
HELEN C. RODGERS,
E. Y. THORPE,